United States Patent
Vuyyuru

(10) Patent No.: US 8,725,179 B2
(45) Date of Patent: May 13, 2014

(54) SYSTEM FOR DISTRIBUTED SPECTRUM SENSING IN A HIGHLY MOBILE VEHICULAR ENVIRONMENT

(75) Inventor: Rama Krishna Vuyyuru, Somerset, NJ (US)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 238 days.

(21) Appl. No.: 13/417,006

(22) Filed: Mar. 9, 2012

(65) Prior Publication Data

US 2013/0237263 A1 Sep. 12, 2013

(51) Int. Cl.
*H04W 4/02* (2009.01)
(52) U.S. Cl.
USPC ............... 455/456.3; 455/452.1; 455/509; 455/515
(58) Field of Classification Search
USPC ............ 455/509, 517, 62, 452.1, 450, 515, 455/67.16, 67.11, 434, 425, 454, 502, 455/456.3, 456.1, 453, 414.2; 370/329, 310
See application file for complete search history.

(56) References Cited

U.S. PATENT DOCUMENTS

| | | | |
|---|---|---|---|
| 2004/0259558 A1* | 12/2004 | Skafidas et al. | 455/450 |
| 2012/0039284 A1* | 2/2012 | Barbieri et al. | 370/329 |
| 2012/0072990 A1* | 3/2012 | Gutt et al. | 726/25 |
| 2013/0201928 A1* | 8/2013 | Kim et al. | 370/329 |

OTHER PUBLICATIONS

Haykin, Simon et al., "Spectrum Sensing for Cognitive Radio," Proceedings of the IEEE, May 2009, pp. 849-877, vol. 97, No. 5.
Yücek, Tevfik et al., "A Survey of Spectrum Sensing Algorithms for Cognitive Radio Applications," IEEE Communications Surveys & Tutorials, 2009, pp. 116-130, vol. 11, No. 1.

* cited by examiner

*Primary Examiner* — John J Lee
(74) *Attorney, Agent, or Firm* — Patent Law Works LLP

(57) ABSTRACT

A system and method for detecting spectrum holes in a region is disclosed. The system comprises a requesting module, a detecting module and an aggregation module. The requesting module retrieves channel availability data for a region. The channel availability data describes potential availability of a channel. The detecting module obtains a set of values for the channel by spectrum sensing at a set of locations in the region based at least in part on the potential availability of the channel. The aggregation module aggregates the set of values for the channel over the set of locations in the region to obtain a first value for the channel and determines the availability of the channel based at least in part on the first value for the channel.

24 Claims, 15 Drawing Sheets

450

|  | Ch-1 | Ch-2 | Ch-3 | Ch-4 | Ch-5 |
|---|---|---|---|---|---|
| 452 — Vehicle at location x1 | 1 | 0 | 1 | 0 | 1 |
| 454 — Vehicle at location x2 | 0 | 0 | 1 | 0 | 1 |
| 456 — Vehicle at location x3 | 0 | 1 | 1 | 1 | 1 |
| 458 — Vehicle at location x4 | 0 | 0 | 0 | 1 | 1 |
| 460 — By Applying AND rule | 0 | 0 | 0 | 0 | 1 |

470

|  | Ch-1 | Ch-2 | Ch-3 | Ch-4 | Ch-5 |
|---|---|---|---|---|---|
| 472 — Vehicle 1 | 1 | 0 | 1 | 0 | 1 |
| 474 — Vehicle 2 | 0 | 0 | 1 | 0 | 1 |
| 476 — Vehicle 3 | 0 | 1 | 1 | 1 | 1 |
| 478 — Vehicle 4 | 0 | 0 | 0 | 1 | 1 |

Figure 4C

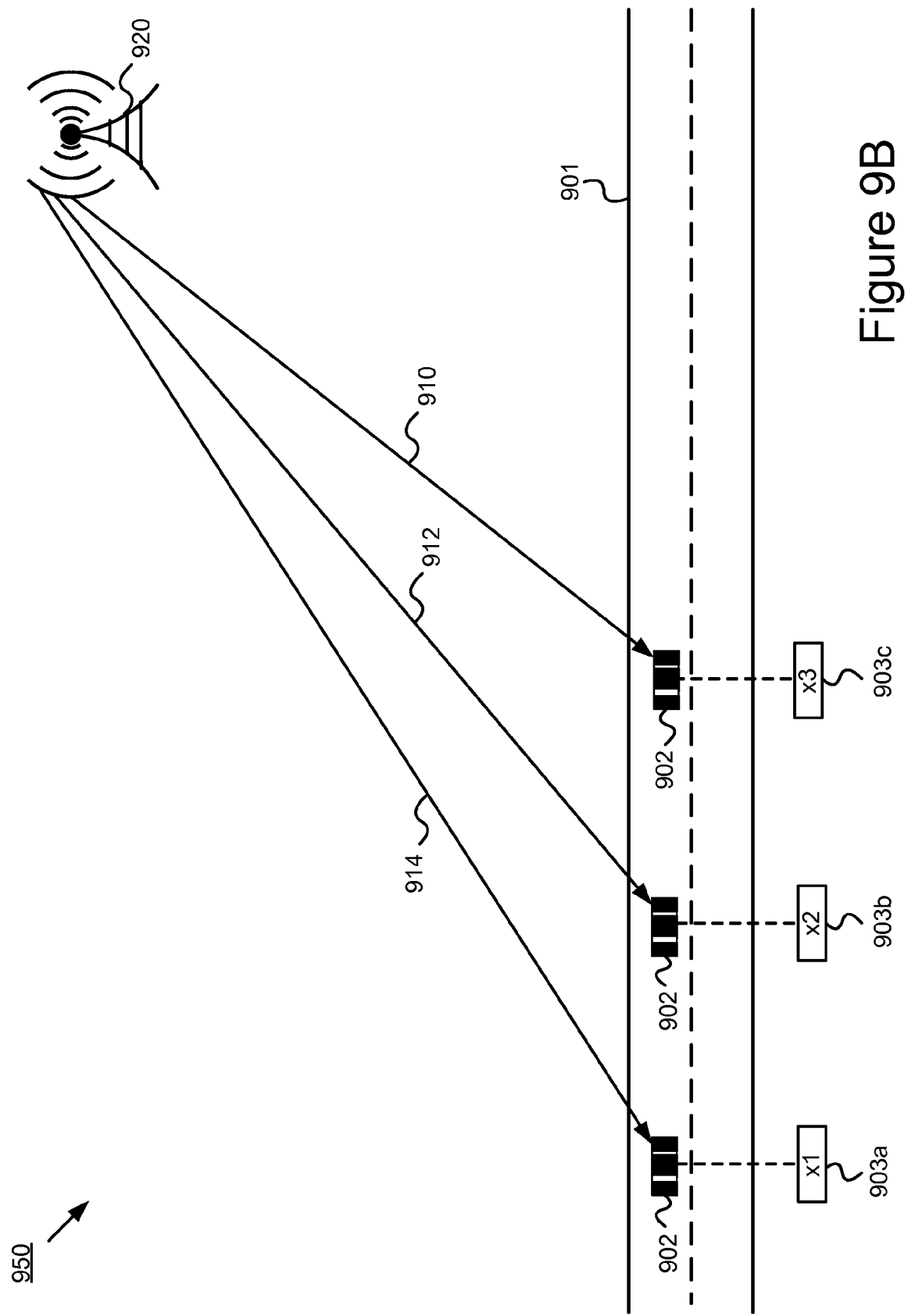

SYSTEM FOR DISTRIBUTED SPECTRUM SENSING IN A HIGHLY MOBILE VEHICULAR ENVIRONMENT

BACKGROUND

The specification relates to spectrum sensing systems. In particular, the specification relates to a system and method for detecting spectrum holes in a region under a highly mobile vehicular environment.

In a mobile vehicular environment, spectrum sensing systems use collaborative spectrum sensing to detect spectrum holes in a region under shadowing and fading situations. In such an environment where a transmitter is much farther when compared with collaborative vehicle nodes (that is, the distance between the transmitter and a vehicle node is much larger than the distance between the collaborative vehicle nodes), using collaborative spectrum sensing beneficially improves performance of the spectrum sensing systems.

However, existing spectrum sensing systems have numerous problems. For example, the existing spectrum sensing systems need additional overhead on a control channel to share collaborative information between collaborative vehicle nodes. Furthermore, synchronization between collaborative vehicle nodes is required, which increases the complexity of the system.

SUMMARY OF THE INVENTION

The specification overcomes the deficiencies and limitations of the prior art at least in part by providing a system and method for detecting spectrum holes in a region by utilizing previous spatial sensing information. For example, the system and method provided in this specification use mobility as an enabler for achieving location diversity. They use information from sensing performed at previous locations to improve sensing algorithm performance.

Specifically, the specification provides a system and method for determining availability of a channel. The system comprises a requesting module, a detecting module and an aggregation module. The requesting module retrieves channel availability data for a region. The channel availability data describes potential availability of a channel. The detecting module is communicatively coupled to the requesting module. The detecting module obtains a set of values for the channel by spectrum sensing at a set of locations in the region based at least in part on the potential availability of the channel. The aggregation module is communicatively coupled to the detecting module. The aggregation module aggregates the set of values for the channel over the set of locations in the region to obtain a first value for the channel and determines the availability of the channel based at least in part on the first value for the channel.

BRIEF DESCRIPTION OF THE DRAWINGS

The specification is illustrated by way of example, and not by way of limitation in the figures of the accompanying drawings in which like reference numerals are used to refer to similar elements.

FIG. 4C shows an example of a sensing table according to another embodiment.

FIGS. 9A-9B are graphical representations illustrating a mobile vehicular environment where spectrum sensing through location diversity is implemented according to one embodiment.

DETAILED DESCRIPTION OF THE PREFERRED EMBODIMENTS

Figure 1:
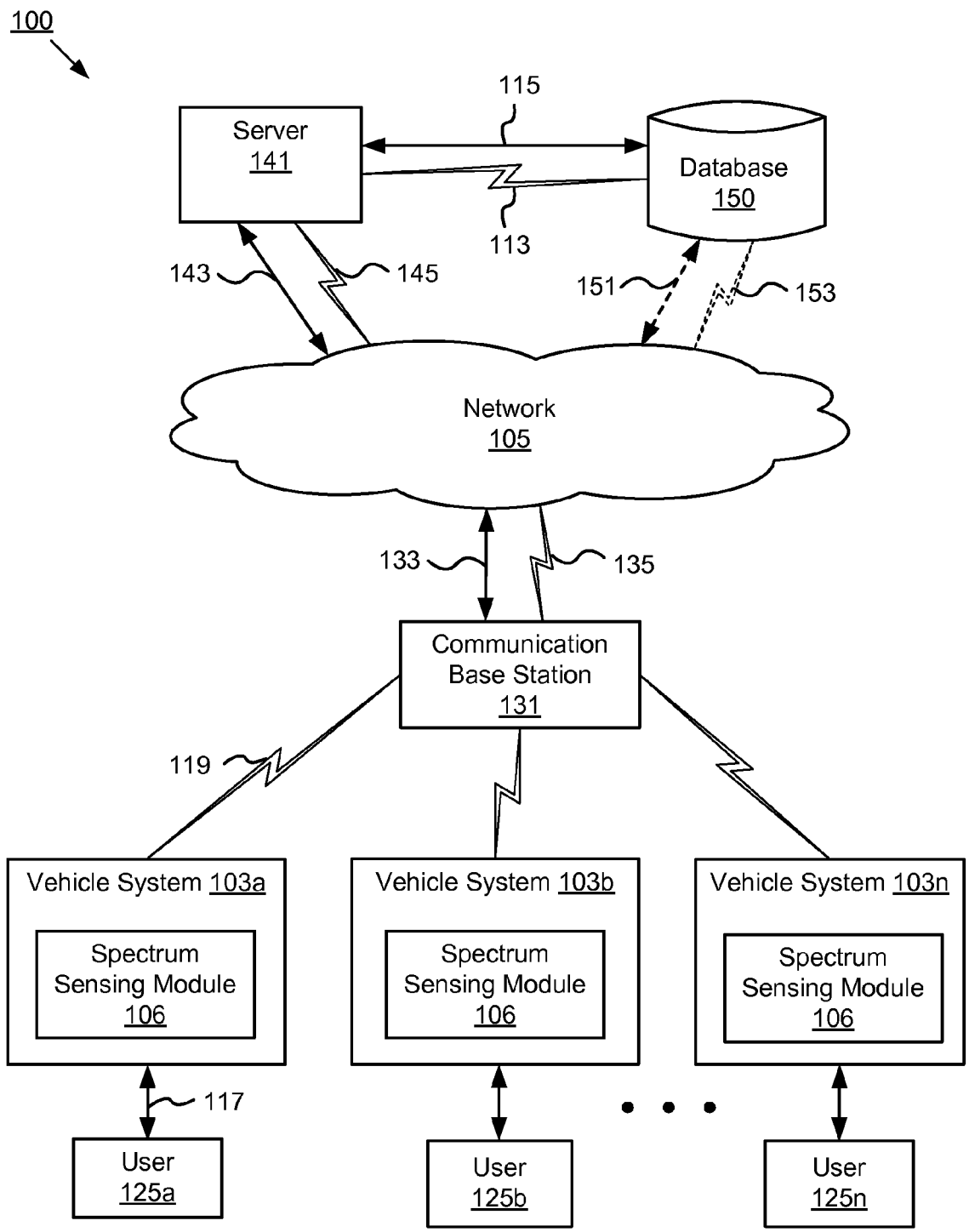
FIG. 1 is a high-level block diagram illustrating a system for detecting spectrum holes in a region according to one embodiment.

A system and method for detecting spectrum holes in a region in a mobile vehicular environment is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for detecting spectrum holes in a region according to one embodiment. The illustrated system 100 includes vehicle systems 103a, 103b, 103n (referred to individually or collectively as communication systems 103) that are accessed by users 125a, 125b, 125n (also referred to collectively or individually as users 125), a communication base station 131, a server 141 and a database 150. The vehicle system 103 includes a spectrum sensing module 106. In the illustrated embodiment, the vehicle systems 103 are communicatively coupled to the communication base station 131. For example, the vehicle systems 103 and the communication based station 131 are communicatively coupled to each other to facilitate the transmission of information (e.g., communication signals, channel availability data) between the vehicle systems 103 and the communication base station 131. The communication base station 131, the server 141 and the database 150 are communicatively coupled to each other via a network 105. For example, the communication base station 131, the server 141 and the database 150 are communicatively coupled to facilitate the communication base station 131 delivering information from the vehicle systems 103 to the server 141 and/or the database 150 and vice versa.

Although three vehicle systems 103a, 103b, 103n, one communication base station 131, one server 141 and one database 150 are illustrated in FIG. 1, persons having ordinary skill in the art will recognize that any number of vehicle systems 103, communication base stations 131, servers 141 and databases 150 can be included in the system 100. Furthermore, while only one network 105 is coupled to the communication base station 131, the server 141 and the database 150, persons having ordinary skill in the art will appreciate that any number of networks 105 can be connected to the communication base station 131, the server 141 and the database 150.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or include portions of a telecommunications network for sending data in a variety of different communication protocols. For example, the network 105 is a 3G network or a 4G network. In another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, e-mail, etc. In yet another embodiment, all or some of the links in the network 105 are encrypted using conventional encryption technologies such as secure sockets layer (SSL), secure HTTP and/or virtual private networks (VPNs).

In one embodiment, the network 105 is a Vehicular Ad-hoc Network (VANET) that uses moving vehicles as nodes. For example, the network 105 is a mobile network 105 where cars fall out of the signal range and drop out of the network 105 while other cars join in.

In the illustrated embodiment, the database 150 is communicatively coupled to the server 141 via signal line 115 and signal line 113 (wirelessly). The server 141 is communicatively coupled to the network 105 via signal line 143 and signal line 145 (wirelessly). The database 150 is communicatively coupled to the network 105 via signal line 151 and signal line 153 (wirelessly). The signal line 151 and signal line 153 are depicted using dotted lines to indicate that they are optional elements for the system 100. Accordingly, in one embodiment, the database 150 is not communicatively coupled to the network 105 via signal line 151 and signal line 153.

In the illustrated embodiment, the vehicle system 103a is communicatively coupled to the communication base station 131 via signal line 119 (wirelessly). The user 125a interacts with the vehicle system 103a as represented by signal line 117. The vehicle systems 103b, 103n and the users 125b, 125n are coupled and interact in a similar manner respectively. The communication base station 131 is communicatively coupled to the network 105 via signal line 133 and signal line 135 (wirelessly). In one embodiment, signal lines 119, 135, 145, 153 and 113 are any combination of wireless communication channels such as one or more of a 3G, 4G, GPS or any other wireless network communication channel.

The communication base station 131 is any equipment that facilitates wireless communication between user equipment and the network 105. For example, the communication base station 131 is a base transceiver station (BTS) coupled to the network 105 and the vehicle systems 103 to facilitate wireless communication between them. In one embodiment, the communication base station 131 receives signals from the vehicle systems 103 and delivers the signals to the server 141 and/or the database 150 via the network 105. In another embodiment, the communication base station 131 receives channel availability data from the database 150 via the network 105 and delivers the channel availability data to the vehicle systems 103.

In one embodiment, the communication base station 131 receives a request for channel availability data from a vehicle system 103. The communication base station 131 delivers the request to the server 141 and/or the database 150 via the network 105. In one embodiment, the communication base station 131 appends data describing a region where the vehicle system 103 and the communication base station 131 currently are to the request.

The vehicle system 103 is a system embedded in a vehicle. For example, the vehicle is a car. In one embodiment, the vehicle system 103 transmits and/or receives signals to and from the communication base station 131. In another embodiment, the vehicle system 103 transmits and/or receives channel availability data to and from the database 150 via the communication base station 131 and the network 105. In yet another embodiment, the vehicle system 103 broadcasts channel availability data to other vehicle systems 103 through a control channel via the communication base station 131. The vehicle system 103 will be described in further detail below with reference to FIG. 2.

The server 141 is one or more devices having at least one processor coupled to at least one storage device including instruction for execution by the processor. For example, the server 141 is a conventional server, a server array or any other computing device or group of computing devices, having data processing and communication capabilities. In one embodiment, the server 141 is a hardware server device operated by an entity. In one embodiment, the server 141 retrieves channel availability data from the database 150 and delivers the channel availability data to the vehicle systems 103 via the network 105 and the communication base station 131. In another embodiment, the server 141 transmits and/or receives signals to and from the communication base station 131.

The database 150 is any database that stores any data for providing the functionality of the system 100. In one embodiment, the database 150 is an online database accessible from the network 105. In another embodiment, the database 150 is a database accessible from the server 141. For example, the database 150 is a database where data is stored on multiple virtual servers hosted by different companies. In one embodiment, the database 150 stores channel availability data describing potential availability of channels in regions, e.g., potentially available communication channels in regions. For example, the channel availability data is received from a plurality of vehicle systems 103. In another embodiment, the database 150 is accessed by the server 141 to provide channel availability data for a region to vehicle systems 103 that request the channel availability data for that region.

Vehicle System 103

Figure 2:
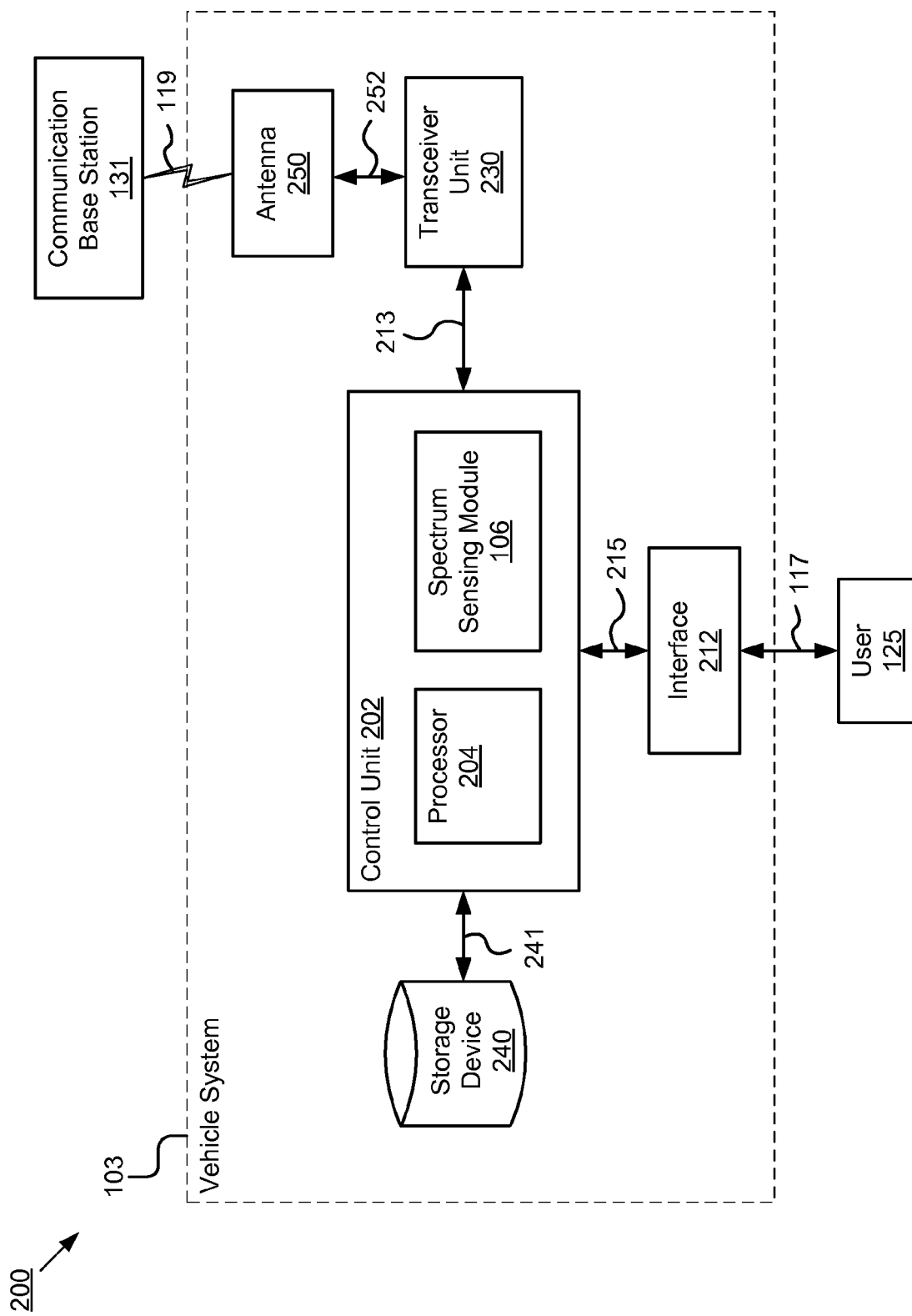
FIG. 2 is a block diagram illustrating a vehicle system in detail according to one embodiment.

Referring now to FIG. 2, depicted is an embodiment 200 of the vehicle system 103 in detail. The illustrated vehicle system 103 includes a control unit 202, an interface 212, a storage device 240, a transceiver unit 230 and an antenna 250. Although only one control unit 202, one interface 212, one storage device 240, one transceiver unit 230 and one antenna 250 are depicted in FIG. 2, persons having ordinary skill in the art will recognize that the vehicle system 103 can include any number of control units 202, interfaces 212, storage devices 240, transceiver units 230 and antennas 250. Furthermore, persons having ordinary skill in the art will also appreciate that the vehicle system 103 may include other entities not shown in FIG. 2 such as a speaker, a display device, an input device, etc.

In the illustrated embodiment, the interface 212 is communicatively coupled to the control unit 202 via signal line 215. The user 125 interacts with the interface 212 as represented by signal line 117. The storage device 240 is communicatively coupled to the control unit 202 via signal line 241. The transceiver unit 230 is communicatively coupled to the control unit 202 via signal line 213. The transceiver unit 230 is communicatively coupled to the antenna 250 via signal line 252. The antenna 250 is communicatively coupled to the communication base station 131 via signal line 119 (wirelessly).

The transceiver unit 230 is any computing device that transmits and receives signals. For example, the transceiver unit 230 includes a Dedicated Short Range Communications (DSRC) device. In one embodiment, the transceiver unit 230 is implemented using hardware such as field-programmable gate array (FPGA) or an application-specific integrated circuit (ASIC). In another embodiment, the transceiver unit 230 is implemented using a combination of hardware and software. In one embodiment, the transceiver unit 230 transmits and receives signals to and from the antenna 250. The antenna 250 transmits and receives signals wirelessly to and from the communication base station 131.

In one embodiment, the transceiver unit 230 transmits and receives signals to and from transceiver units 230 in other vehicle systems 103 via the communication base station 131. In another embodiment, the transceiver unit 230 transmits and receives channel availability data to and from the database 150 via the communication base station 131. For example, the transceiver unit 230 receives channel availability data from the database 150 via the communication base station 131 and delivers the channel availability data to the control unit 202.

In one embodiment, the transceiver unit 230 receives sensing information describing one or more sensed values for one or more communication channels from another vehicle system 103 via the communication base station 131. The transceiver unit 230 sends the sensing information to the control unit 202 to determine availability of one or more communication channels based at least in part on the sensing information. In another embodiment, the transceiver unit 230 receives sensing information from the control unit 202 and broadcasts the sensing information to other vehicle systems 103.

The control unit 202 is any processor-based computing device. For example, the control unit 202 is an electronic control unit ("ECU") implemented in a vehicle. In one embodiment, the control unit 202 is implemented using a single integrated circuit such as a system-on-chip (SOC).

In one embodiment, the control unit 202 comprises, among other things, a processor 204 and a spectrum sensing module 106. In another embodiment, the control unit 202 includes other components conventional to a control unit such as a memory (not pictured) and an I/O interface (not pictured).

The processor 204 comprises an arithmetic logic unit, a microprocessor, a general purpose controller or some other processor array to perform computations, retrieve data stored on the storage device 240, etc. The processor 204 processes data signals and may comprise various computing architectures including a complex instruction set computer (CISC) architecture, a reduced instruction set computer (RISC) architecture, or an architecture implementing a combination of instruction sets. Although only a single processor 204 is shown in FIG. 2, multiple processors 204 may be included. The processing capability of the processor 204 may be limited to supporting the display of signals and the capture and transmission of signals. The processing capability of the processor might be enough to perform more complex tasks, including various types of feature extraction and sampling. It will be obvious to one skilled in the art that other processors, operating systems, sensors, displays and physical configurations are possible.

The spectrum sensing module 106 is code and routines for detecting spectrum holes in a region. A spectrum hole is defined as a communication channel (e.g., a range of frequencies, a spectrum band) available to a secondary user in a specific time and space. For example, if in a specific time and space a channel is not used by a primary user, that is, no primary user is present in the channel in the specific time and space, then the channel is available for a non-interfering use of a secondary user and thus the channel in the specific time and space is a spectrum hole. To simplify and clarify the present description, the spectrum holes will be also referred to as available communication channels, available channels and unoccupied channels.

In one embodiment, the spectrum sensing module 106 receives channel availability data from the database 150 via the transceiver unit 230. The channel availability data describes potential availability of channels in a region, e.g., potentially available channels in a region. The spectrum sensing module 106 obtains values for the potentially available channels at a set of locations in the region by running spectrum sensing algorithms at the set of locations. The spectrum sensing module 106 aggregates the sensed values over the set of locations and determines the availability of the channels. In one embodiment, the spectrum sensing module 106 also broadcasts sensing information describing sensed values for channels to other vehicle systems 103. In another embodiment, the spectrum sensing module 106 receives sensing information from another vehicle system 103 and merges the received sensing information with its own sensing information.

In one embodiment, the spectrum sensing module 106 includes codes and routines stored in an on-chip storage of the processor 204. In another embodiment, the spectrum sensing module 106 is implemented using hardware such as a field-programmable gate array (FPGA) or an application-specific integrated circuit (ASIC). In yet another embodiment, the spectrum sensing module 106 is implemented using a combination of hardware and software. The spectrum sensing module 106 will be described in more detail below with reference to FIG. 3.

The interface 212 is a device configured to handle communications between the user 125 and the control unit 202. For example, the interface 212 includes one or more of an in-vehicle touch screen for receiving inputs from the user 125 and a microphone for capturing voice inputs from the user 125. The interface 212 sends the inputs from the user 125 to the control unit 202. In one embodiment, the interface 212 is configured to transmit an output from the control unit 202 to the user 125. For example, the interface 212 includes an audio system for playing a voice prompt to the user 125 indicating communication conditions detected by the control unit 202. One having ordinary skill in the art will recognize that the interface 212 may include other types of devices for providing the functionality described herein.

The user 125a is a human user. In one embodiment, the user 125 is a driver driving a vehicle on a road. The user 125 interacts with, or otherwise provides an input to, an interface 212, which sends and receives different types of data to and from the control unit 202. For example, the interface 212 is a touch screen and the user 125 touches a portion of the touch screen with a finger or a stylus to provide an input.

The storage device 240 is a non-transitory memory that stores data. For example, the storage device 240 is a dynamic random access memory (DRAM) device, a static random access memory (SRAM) device, flash memory or some other memory device known in the art. In one embodiment, the storage device 240 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art. The storage device 240 will be described in more detail below with reference to FIG. 4.

The antenna 250 is an electrical device that converts electric currents into radio waves, and vice versa. For example, the antenna 250 is a steerable beam directional antenna. The antenna 250 is used with the transceiver unit 230. In one embodiment, the antenna 250 receives signals from the communication base station 131 and sends the received signals to the transceiver unit 230 for processing. In another embodiment, the antenna 250 receives signals from the transceiver unit 230 and delivers the signals to other vehicle systems 103 via the communication base station 131.

Spectrum Sensing Module 106

Figure 3:
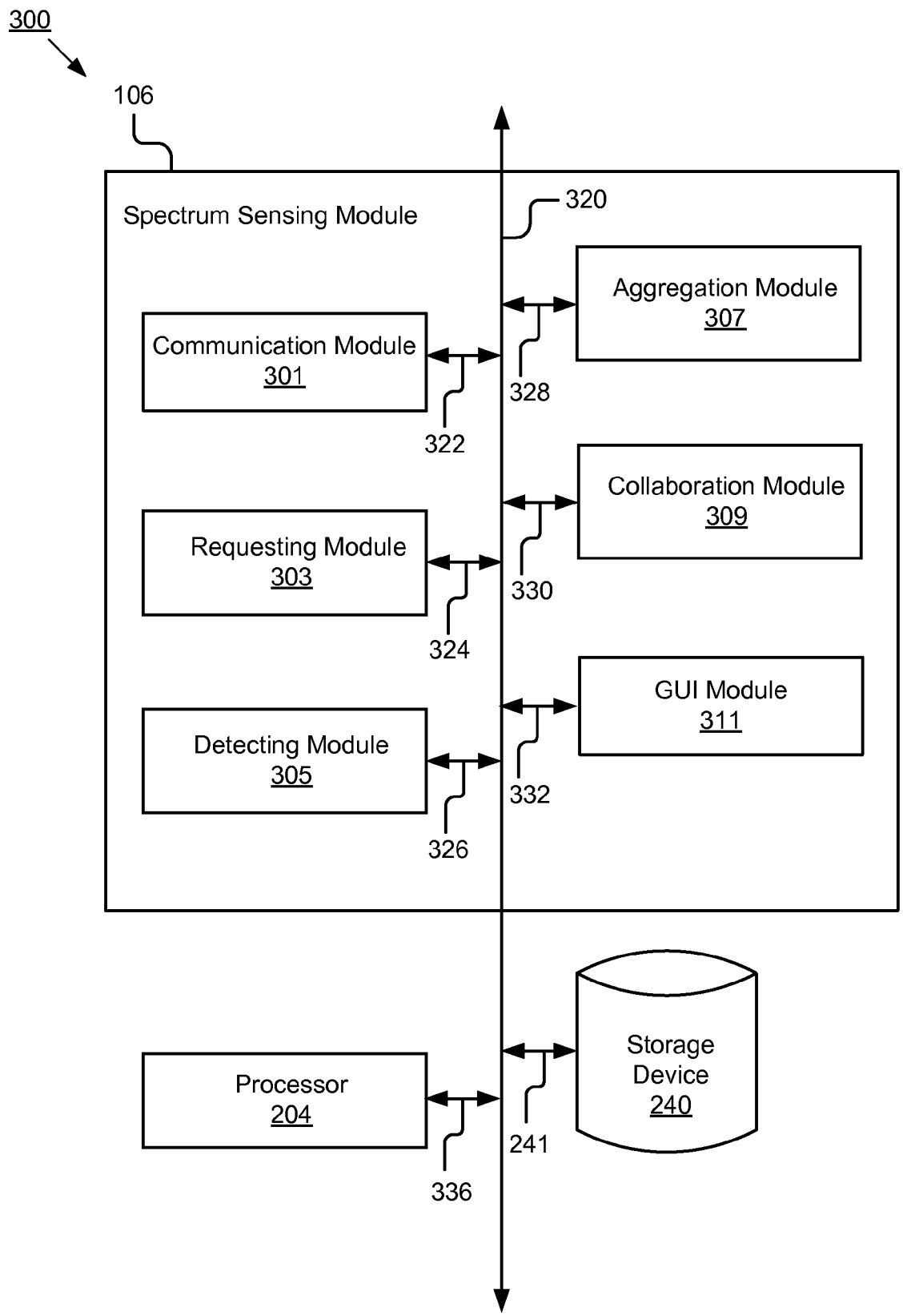
FIG. 3 is a block diagram illustrating a spectrum sensing module according to one embodiment.

Referring now to FIG. 3, a spectrum sensing module 106 is shown in more detail. FIG. 3 is a block diagram 300 illustrating a spectrum sensing module 106 according to one embodiment. The spectrum sensing module 106 comprises a communication module 301, a requesting module 303, a detecting module 305, an aggregation module 307, a collaboration module 309 and a graphical user interface (GUI) module 311. These components of the spectrum sensing module 106 are communicatively coupled to a bus 320 for communication with one another.

In the illustrated embodiment, the communication module 301 is communicatively coupled to the bus 320 via signal line 322. The requesting module 303 is communicatively coupled to the bus 320 via signal line 324. The detecting module 305 is communicatively coupled to the bus 320 via signal line 326. The aggregation module 307 is communicatively coupled to the bus 320 via signal line 328. The collaboration module 309 is communicatively coupled to the bus 320 via signal line 330. The GUI module 311 is communicatively coupled to the bus 320 via signal line 332. The processor 204 is communicatively coupled to the bus 320 via signal line 336. The storage device 240 is communicatively coupled to the bus 320 via signal line 241.

The communication module 301 is code and routines for handling communication between components of the spectrum sensing module 106 and other components of the vehicle system 103. For example, the communication module 301 receives a request for channel availability data for a region from the requesting module 303 and sends the request to the transceiver unit 230. The transceiver unit 230 delivers the request to the server 141 and/or the database 150 via the communication base station 131 and the network 105. The communication module 301 is communicatively coupled to the bus 320 via signal line 322.

In one embodiment, the communication module 301 receives channel availability data from the database 150 via the network 105, the communication base station 131 and the transceiver unit 230. The channel availability data describes potential availability of channels in a region, e.g., potentially available channels in the region. The communication module 301 delivers the channel availability data to the detecting module 305. In one embodiment, the communication module 301 stores the channel availability data in the storage device 240.

In one embodiment, the communication module 301 receives sensing information describing one or more sensed values for one or more channels from the collaboration module 309. The sensing information is used to determine the availability of the one or more channels. In one embodiment, the sensing information is populated in one or more sensing tables. The communication module 301 transmits the one or more sensing tables to the transceiver unit 230 that broadcasts the one or more sensing tables to other vehicle systems 103 via the network 105.

In another embodiment, the communication module 301 receives sensing information describing one or more sensed values for one or more channels from other vehicle systems 103. The communication module 301 delivers the received sensing information to the collaboration module 309. In one embodiment, the communication module 301 stores the received sensing information in the storage device 240. For example, the received sensing information is stored in one or more sensing tables.

In one embodiment, the communication module 301 receives graphical data from the GUI module 311. The communication module 301 sends the graphical data to the interface 212 via the control unit 202 for displaying information to a user 125. For example, the graphical data is used to generate a user interface for displaying communication conditions to the user 125.

In one embodiment, the communication module 301 also handles the communications between other sub-modules 303, 305, 307, 309 and 311 in the spectrum sensing module 106. For example, the communication module 301 communicates with the detecting module 305 and the aggregation module 307 to pass an output of the detecting module 305 (such as a sensing table) to the aggregation module 307. However, this description may occasionally omit mention of the communication module 301 for purposes of clarity and convenience. For example, for purposes of clarity and convenience, the above scenario may be described as the detecting module 305 passing an output (such as a sensing table) to the aggregation module 307.

The requesting module 303 is code and routines for requesting channel availability data. For example, the requesting module 303 generates a request for channel availability data for a region. In one embodiment, the request includes data describing a current physical location of the vehicle or a region where the vehicle currently is. The request can also include data describing a time when the request is generated. The requesting module 303 sends the request for channel availability data for a region to the server 141 and/or the database 150. The requesting module 303 is communicatively coupled to the bus 320 via signal line 324.

In another embodiment, the requesting module 303 sends a request for channel availability data to the communication base station 131. The communication base station 131 appends data describing a current region to the request and delivers the request to the server 141 and/or the database 150.

In one embodiment, the requesting module 303 sends a search query to the server 141 and/or the database 150 via the communication module 301. The search query includes one or more search criteria such as a region that, for example, identifies channel availability data in the database 150 that the vehicle in the region needs. The search query is then used to identify channel availability data for the region in the database 150 and the channel availability data for the region is transmitted back to the detecting module 305 via the communication module 301.

The detecting module 305 is code and routines for obtaining values for channels by sensing at a set of locations. For example, the detecting module 305 runs a sensing algorithm to obtain sensing information for a set of channels indicated as potentially available by the channel availability data. The detecting module 305 runs the sensing algorithm independently at different locations in the region to obtain a set of sensed values and generates a sensing table based on the set of sensed values. The detecting module 305 sends the sensing table to the aggregation module 307 via the communication module 301. The detecting module 305 is communicatively coupled to the bus 320 via signal line 326.

The detecting module 305 receives channel availability data from the communication module 301 and identifies one or more channels that are potentially available for secondary use based at least in part on the channel availability data. For each channel potentially available for secondary use, the detecting module 305 runs a sensing algorithm independently at a set of locations in the region. For example, the locations in the set are geographically close to each other. The locations are, for example, consecutive positions along the vehicle's driving path on a road. The sensing algorithm is a common spectrum sensing algorithm such as energy detection and matched filter detection.

By running the common sensing algorithm, the detecting module 305 obtains a set of sensed values for the one or more channels at the set of locations as sensing information. In one embodiment, the detecting module 305 detects a state of primary user for each channel at each location. The state of primary user (e.g., ON and OFF, 0 and 1) indicates the presence or absence of a primary user in a channel. In another embodiment, the detecting module 305 measures a value of signal power for each channel at each location. For example, the value of signal power describes the strength of the primary user signal. The detecting module 307 compares the value of signal power with a certain threshold value to determine the presence or absence of a primary user in the channel. For example, the detecting module 307 determines that the value of the signal power is smaller than the threshold value and therefore determines that the channel is not occupied. For a given threshold value, probability of channel being occupied or not being occupied will change.

The detecting module 305 generates one or more sensing tables based at least in part on the sensing information. For example, the detecting module 305 generates a sensing table using the detected states of primary users for channels at the set of locations. In another example, the detecting module 305 generates a sensing table using the measurements of signal powers for the channels at the set of locations. In one embodiment, the detecting module 305 sends the one or more sensing tables to the aggregation module 307. Using the sensing tables, the aggregation module 307 can easily aggregate the sensing information included in the sensing tables. In another embodiment, the detecting module 305 also stores the one or more sensing tables in the storage device 240.

In one embodiment, the detecting module 305 also determines how much location diversity is required before coming to a spectrum sensing decision. For example, the detecting module 305 determines how many locations to detect before passing sensing information to the aggregation module 307 to make a spectrum sensing decision of channel availability. For applications that require a higher probability of detection and low false detection, the detecting module 307 detects continuously with certain location intervals. For other applications, the detecting module 307 measures values at a certain number of locations such as five locations before sending the values to the aggregation module 307 to make a sensing decision. If one or more channels are detected as occupied by primary users with a certain probability, the detecting module 307 removes the one or more occupied channels from further enhancement of sensing.

The aggregation module 307 is code and routines for aggregating sensing information over the set of locations. For example, the aggregation module 307 aggregates the states of primary users in channels over the set of locations based on hard decision fusion. The hard decision fusion includes applying AND rule on the states over the set of locations for each channel. In one embodiment, the aggregation module 307 passes an output such as a determination of available channels to the collaboration module 309. The aggregation module 307 is communicatively coupled to the bus 320 via signal line 328.

The aggregation module 307 receives a sensing table from the detecting module 305. In one embodiment, the sensing table includes states of primary users in channels at a set of locations. For example, the state is a binary state (e.g., ON and OFF, 0 and 1) indicating the presence or absence of a primary user in a channel. The aggregation module 307 aggregates the states of a primary user in a channel over a set of locations based on hard decision fusion. For example, the aggregation module 307 applies AND rule on the states of a primary user over the set of locations for each channel. In another example, the aggregation module applies OR rule on the states of primary user over the set of locations for each channel. Therefore, the aggregation module 307 obtains an aggregated state of a primary user for each channel such as 0 and 1.

The aggregation module 307 determines the availability of a channel based at least in part on the aggregated state of a primary user for the channel. For example, if the aggregated state of a primary user for a channel is 1 or OFF that indicates the absence of a primary user in the channel, the aggregation module 307 determines that the channel is available. Otherwise, the aggregation module 307 determines that the channel is occupied by a primary user and thus is not available.

In another embodiment, the sensing table includes values of signal power for channels at a set of locations. The aggregation module 307 aggregates the values of signal power over the set of locations for each channel based on soft decision fusion. For example, the aggregation module 307 correlates the values over the set of locations. The aggregation module then determines the availability of the channel based at least in part on the aggregated value of the signal power.

In yet another embodiment, the aggregation module 307 uses weight based aggregation to merge sensing information. For example, the aggregation module 307 assigns a higher weight to a measurement at a location that is geographically closer to the primary transmitter (e.g., the communication base station 131) than a location farther from the primary transmitter. The aggregation module 307 then aggregates the weighted measurements and determines the availability of a channel based at least in part on the aggregation.

In one embodiment, if the aggregation module 307 determines that the sensing information reaches a sensing threshold, the aggregation module 307 transmits the sensing information to the collaboration module 309 to broadcast the sensing information to other vehicle systems 103. The sensing threshold is the required minimum data before sharing the sensing information with other vehicle systems 103 since a vehicle system 103 without enough information (e.g., sensing data points) might affect average values of other vehicle systems 103. In one embodiment, the sensing data point is an instance of sensing and a sensed value is any measured value for each instance. The sensing threshold refers to the number of sensing instances. For example, for any given channel the vehicle system 103 needs to reach a sensing threshold such as five data points before sharing this information with other vehicle systems 103.

The collaboration module 309 is code and routines for broadcasting sensing information to other vehicle systems 103 in the same region and aggregating received sensing information from other vehicle systems 103 in the same region. In one embodiment, the collaboration module 309 receives sensing information from the aggregation module 307 and broadcasts the sensing information to other vehicle systems 103 in the same region. For example, the collaboration module 309 sends the sensing information to the communication base station 131 and the communication base station 131 broadcasts the sensing information to other vehicle systems 103 in the same region over a control channel. The collaboration module 309 is communicatively coupled to the bus 320 via signal line 330.

In one embodiment, the collaboration module 309 receives a sensing table from the aggregation module 307 including one or more sensed values for one or more channels at a set of locations. The sensing table can also include aggregated sensed values for the one or more channels. For example, the sensing table includes aggregated states of primary users for channels generated based on hard decision fusion. The collaboration module 309 broadcasts the sensing table to other vehicle systems 103 in the same region. In another embodiment, the collaboration module 309 receives a sensing table including only aggregated sensed values for one or more channels from the aggregation module 307 and broadcasts the sensing table to other vehicle systems 103 in the same region.

In one embodiment, the collaboration module 309 receives sensing tables including sensing information from other vehicle systems 103 in the same region via the communication module 301. The collaboration module 309 aggregates the sensing information from other vehicle systems 103 with the sensing information from its own vehicle system 103. For example, the sensing information describes states of primary users in one or more channels. The collaboration module 309 merges the states of primary user for each channel over different vehicle systems 103 based on hard decision fusion. For example, the collaboration module 309 applies AND rule on the states of primary user for each channel over different vehicle systems 103 and obtains an aggregated state of primary user for each channel. The collaboration module 309 then determines the availability of each channel based at least in part on the aggregated state of primary user.

In one embodiment, the collaboration module 309 transmits a determination of channel availability to the database 150 via the communication base station 131 and the network 105. The database 150 then updates channel availability data stored in it based at least in part on the determination of channel availability from the collaboration module 309.

The GUI module 311 is code and routines for providing graphical data for a user 125. The GUI module 311 is communicatively coupled to the bus 320 via signal line 332. In one embodiment, the GUI module 311 generates graphical data for depicting a user interface to display information to a user 125. In other embodiments, the GUI module 311 generates graphical data for depicting a user interface by which a user 125 inputs information to the communication system 103. The GUI module 311 sends the generated graphical data to the interface 212, causing the interface 212 to present the user interface to the user 125.

Storage Device 240

Figure 4A:
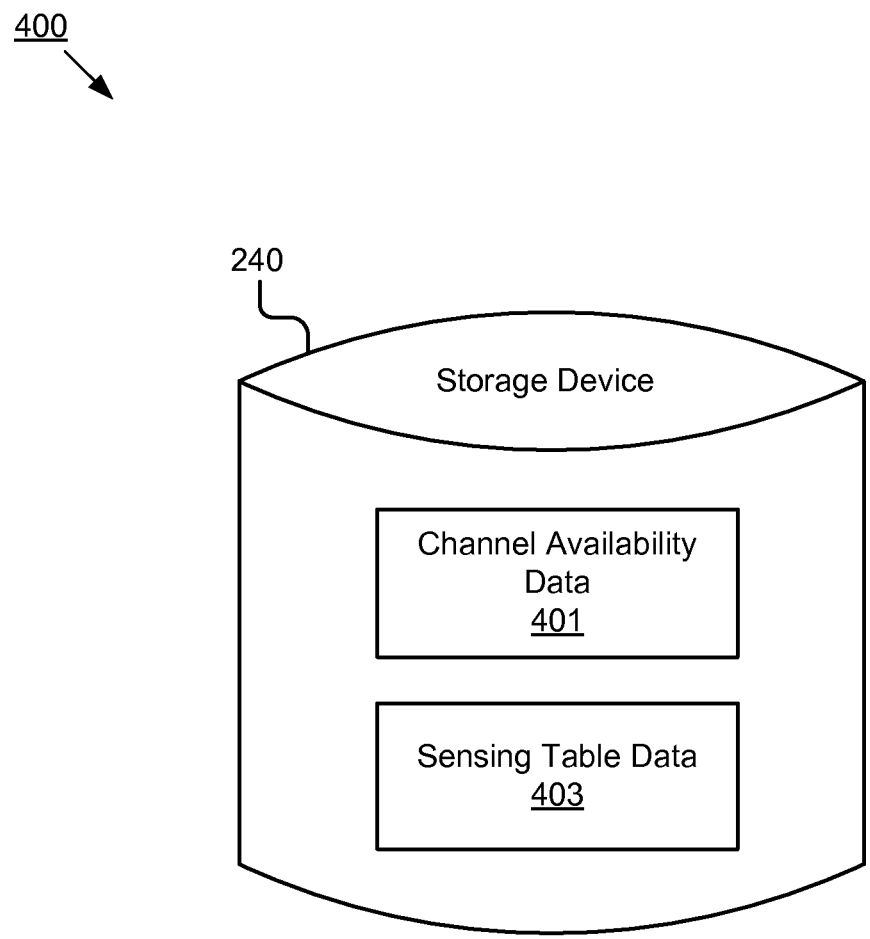
FIG. 4A is a block diagram illustrating a storage device according to one embodiment.

FIG. 4A is a block diagram 400 illustrating a storage device 240 according to one embodiment. The storage device 240 includes channel availability data 401 and sensing table data 403. One skilled in the art will recognize that the storage device 240 may include other data for providing the functionality described herein.

The channel availability data 401 is data describing potential availability of channels in a region, e.g., potentially available channels in a region. For example, the requesting module 303 requests channel availability data 401 for a region from the database 150. The communication module 301 receives the channel availability data for the region from the database 150 and stores it in the storage device 240. The communication module 301 also delivers the channel availability data to the detecting module 305 to detect the presence or absence of a primary user for each potentially available channel indicated by the channel availability data.

The sensing table data 403 is data describing one or more sensing tables that include sensing information. For example, the detecting module 305 generates one or more sensing tables based at least in part on the sensing information such as detected states of primary users for channels at a set of locations. The sensing table can also include aggregated sensed values for channels. In one embodiment, the sensing table data 403 stores one or more sensing tables received from other vehicle systems 103.

Figure 4B:
FIG. 4B shows an example of a sensing table according to one embodiment.

FIG. 4B shows an example of a sensing table 450 according to one embodiment. In the illustrated example, the sensing table 450 includes entries 452, 454, 456, 458, 460. The entries 452, 454, 456, 458 include sensed values for potentially available channels at a set of locations (e.g., location x1, location x2, location x3, location x4). For example, the sensed values indicate states (e.g., 0, 1) describing the presence or absence of primary users in the potentially available channels. The entry 460 includes aggregated sensed values for potentially available channels. For example, an aggregated sensed value such as a state of primary user in one channel is obtained by applying AND rule over the states at the set of locations for that channel.

FIG. 4C shows an example of a sensing table 470 according to another embodiment. The sensing table 470 includes entries 472, 474, 476, 478 that include sensed values for potentially available channels from a set of vehicles (e.g., vehicle 1, vehicle 2, vehicle 3, vehicle 4). For example, the sensed values for the potentially available channels describe presence or absence states of primary users in the channels detected by the set of vehicles.

Methods

Referring now to FIGS. 5-7B, various embodiments of the method of the specification will be described.

Figure 5:
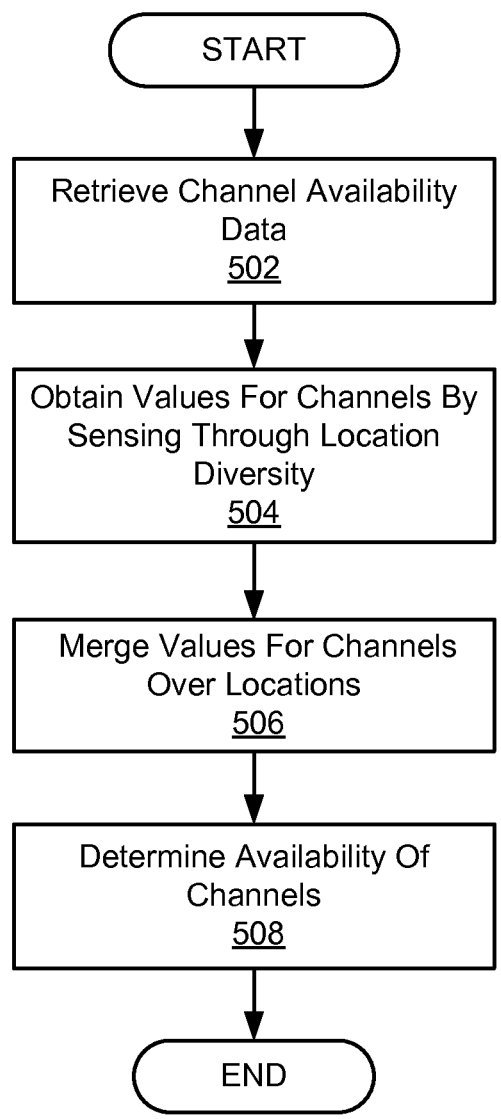
FIG. 5 is a flow diagram illustrating a method for detecting spectrum holes in a region according to one embodiment.

FIG. 5 is a flow diagram illustrating a method 500 for detecting spectrum holes in a region according to one embodiment. The requesting module 303 retrieves 502 channel availability data from the database 150. In one embodiment, the requesting module 303 generates a request for channel availability data for a region. For example, the request includes data describing the region where the vehicle currently is. The requesting module 303 sends the request to the server 141 and/or the database 150 via the communication module 301. In another embodiment, the requesting module 303 sends a search query to the server 141 and/or the database 150. The search query includes search criteria such as a region that, for example, identifies channel availability data in the database 150 that the vehicle in the region needs. The search query is then used to identify channel availability data for that region in the database 150.

At step 504, the detecting module 305 obtains values for channels by sensing through location diversity. The channels are indicated by the channel availability data as potentially available channels in the region. For example, the detecting module 305 runs a sensing algorithm to obtain values for the potentially available channels at a set of locations in the region. The sensing algorithm includes a common spectrum sensing algorithm such as energy detection and matched filter detection. The detecting module 305 obtains a set of sensed values for the potentially available channels at a set of locations by running the sensing algorithm at the set of locations.

At step 506, the aggregation module 307 merges sensed values for channels over the set of locations. For example, the aggregation module 307 receives sensed values (e.g., states of primary users) for channels at a set of locations from the detecting module 305 and merges the sensed values for channels over the set of locations based on hard decision fusion. For example, the aggregation module 307 applies AND rule on states of primary user for each channel over the set of locations and obtains an aggregated state of primary user for each channel.

At step 508, the aggregation module 307 determines availability of channels based at least in part on the aggregated sensed values for channels. For example, the aggregated sensed values are states of primary users for channels such as 0 and 1. The state "0" indicates the presence of the primary user in a channel and the state "1" indicates the absence of a primary user in a channel. The aggregation module 307 determines the presence or absence of a primary user in a channel based on the state and thus determines if the channel is available to a secondary use.

Figure 6A:
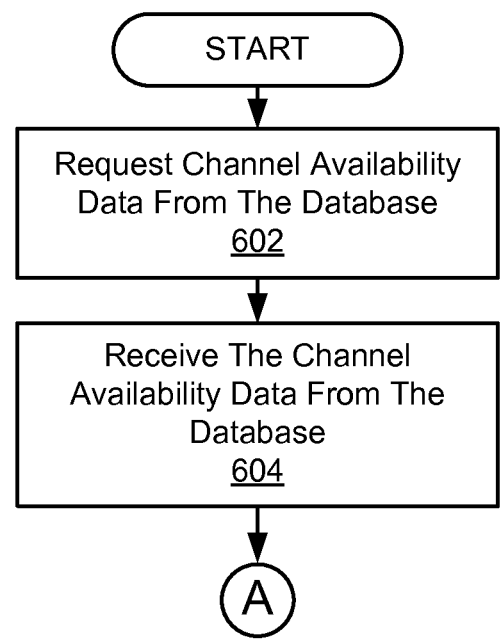
FIGS. 6A-6B are flow diagrams illustrating a method for detecting spectrum holes in a region according to another embodiment.
Figure 6B:
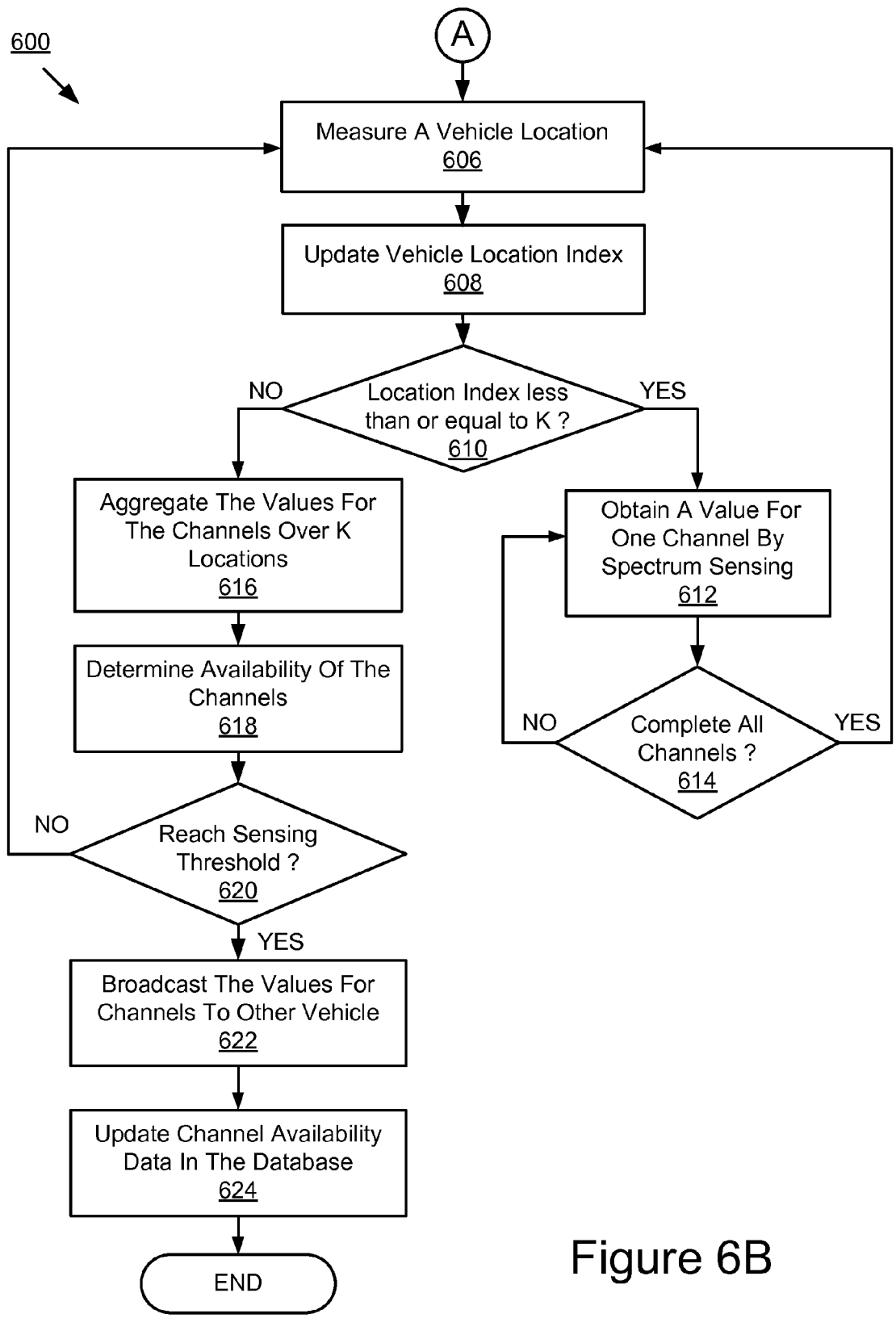

FIG. 6A-6B are flow diagrams illustrating a method 600 for detecting spectrum holes in a region according to another embodiment. The requesting module 303 requests 602 channel availability data from the database 150 via the communication module 301, the communication base station 131 and the network 105. For example, the requesting module 303 generates a request for channel availability data for a region. In one embodiment, the request includes data describing a region where the vehicle currently is. The requesting module 303 sends the request to the server 141 and/or the database 150. In another embodiment, the requesting module 303 sends a request for channel availability data to the communication base station 131. The communication base station 131 appends data describing a region to the request and delivers the request to the server 141 and/or the database 150 via the network 105.

At step 604, the detecting module 305 receives the channel availability data for a region from the database 150. For example, the channel availability data describes the potential availability of channels in the region, e.g., one or more potentially available channels in the region. The detecting module 305 identifies the one or more potentially available channels based at least in part on the channel availability data.

Referring now to FIG. 6B, at step 606, the detecting module 305 measures a vehicle location in the current region. The detecting module 305 records the location using an index. At step 608, the detecting module 305 updates vehicle location index if measuring a new vehicle location. For example, the detecting module 305 increases the vehicle location index by one when measuring a new vehicle location.

At step 610, the detecting module 305 determines if the location index is less than a certain number. For example, the detecting module 305 predetermines how many locations (e.g., 5 locations, 10 locations) are required to detect before coming to a spectrum sensing decision. The detecting module 305 determines if the location index is less than or equal to the predetermined number of locations (e.g., 5 locations, 10 locations). If so, the method 600 proceeds to step 612.

At step 612, the detecting module 305 obtains a sensed value for one potentially available channel by spectrum sensing at this measured location. For example, the detecting module 305 runs a spectrum sensing algorithm at this measured location to obtain a sensed value for one potentially available channel. In one embodiment, the sensed value for the channel indicates a state of primary user in the channel. In another embodiment, the sensed value for the channel is a value of signal power in the channel. At step 614, the detecting module 305 determines whether all potentially available channels have been detected. If the detecting module 305 determines that not all channels have been detected, the method 600 reverts to step 612 and the detecting module 305 obtains a sensed value for a next potentially available channel by spectrum sensing at the measured location. If the detecting module 305 determines that all potentially available channels have been detected at this measured location, the method 600 reverts to step 606 at which the detecting module 305 measures a new vehicle location and method 600 starts from step 606 again.

If at step 610 the detecting module 305 determines that the location index is larger than the certain number of locations, the detecting module 305 transmits the sensed values for the channels at the certain number of locations to the aggregation module 307 and the method proceeds to step 616.

At step 616, the aggregation module 307 receives the sensed values for channels from the detecting module 305 and aggregates the sensed values for channels over the certain number of locations. For example, if the sensed values are states (e.g., 0, 1) of primary users in the channels, the aggregation module 307 merges the states over the certain number of locations based on hard decision fusion. If the sensed values are signal powers in the channels, the aggregation module 307 aggregates the signal powers over the certain number of locations based on soft decision fusion. At step 618, the aggregation module 307 determines availability of the channels based at least in part on the aggregated sensed values for the channels.

At step 620, the aggregation module 307 determines if the sensed values reach a sensing threshold. If so, the aggregation module 307 transmits the aggregated sensed values to the collaboration module 309 and then the method 600 proceeds to step 622. At step 622, the collaboration module 309 broadcasts data describing the aggregated sensed values for the channels to other vehicle systems 103. If the aggregation module 307 determines that the sensed values do not reach a sensing threshold, the method 600 reverts to step 606 and starts again by measuring from a new location.

At step 624, the collaboration module 309 updates channel availability data in the database 150. For example, the collaboration module 309 transmits the determined availability of the channels to the database 150 and the database 150 updates channel availability data for the region based at least in part on the determined availability of the channels.

Figure 7A:
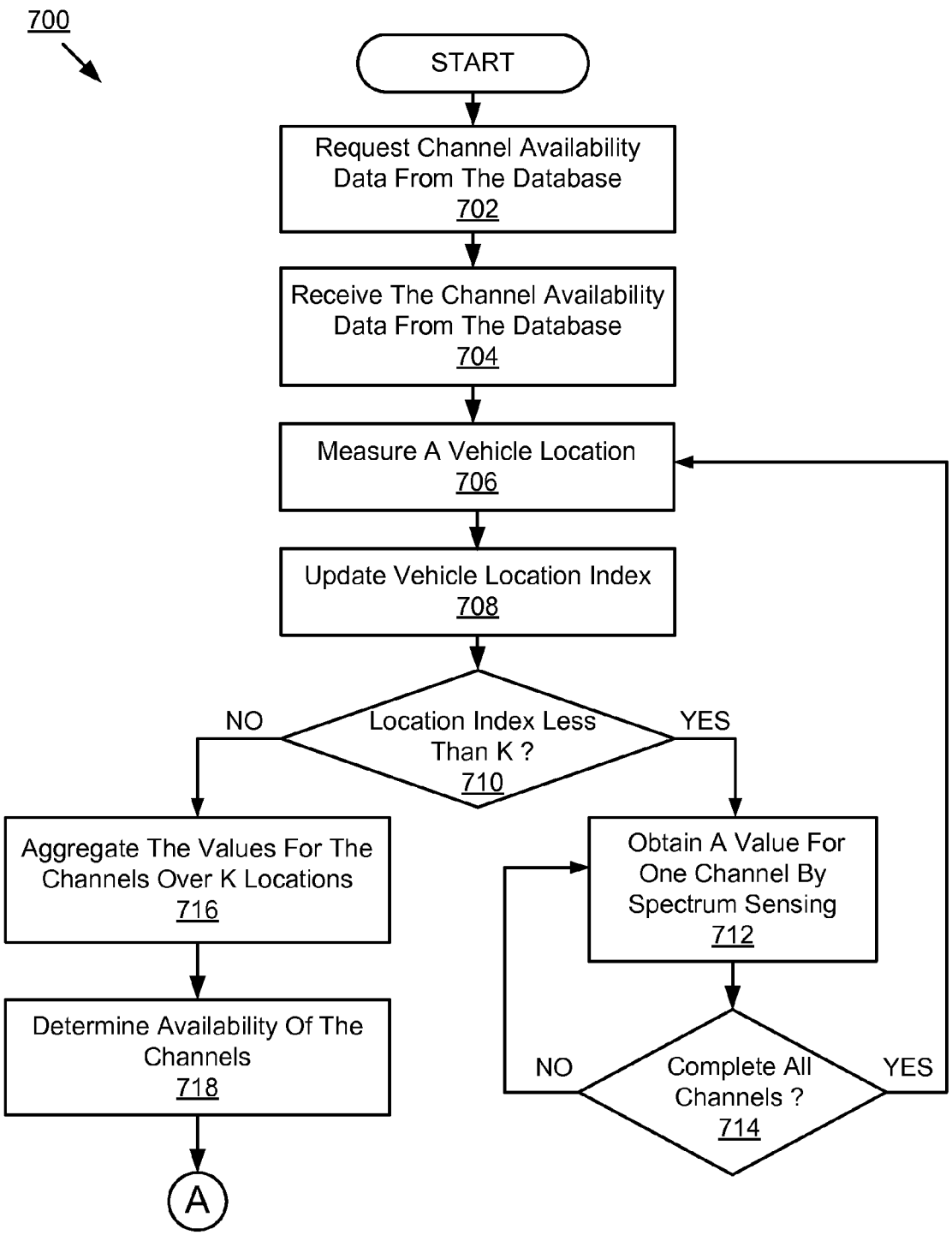
FIGS. 7A-7B are flow diagrams illustrating a method for detecting spectrum holes in a region according to yet another embodiment.
Figure 7B:
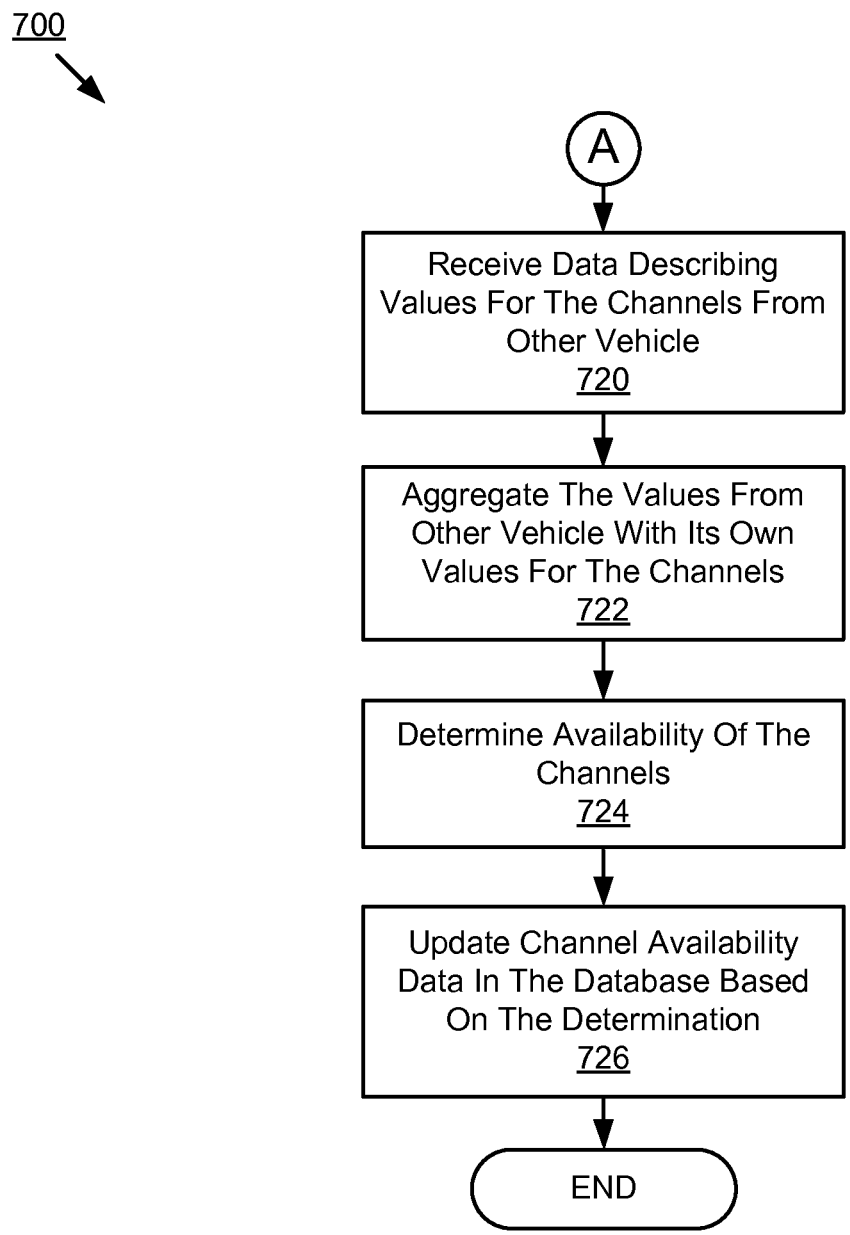

FIGS. 7A-7B are flow diagrams illustrating a method 700 for detecting spectrum holes in a region according to yet another embodiment. At steps 702-718, the method 700 is the same as the method 600 at steps 602-618.

Referring now to FIG. 7B, the collaboration module 309 receives 720 data describing sensed values for channels from other vehicle systems 103. For example, the collaboration module 309 receives a sensing table including sensed values for channels from another vehicle system 103 in the same region via the communication module 301.

At step 722, the collaboration module 309 aggregates the sensed values for the channels from the other vehicle system 103 with its own sensed values for the same channels. For example, if the sensed values are states of primary users for the channels, the collaboration module 309 merges the states with its own sensed states based on hard decision fusion. At step 724, the collaboration module 309 determines availability of the channels based at least in part on the aggregated sensed values.

At step 726, the collaboration module 309 updates channel availability data for the region in the database 150 based at least in part on the determination of availability of the channels. For example, the collaboration module 309 sends the determination of availability of the channels to the database 150 and the database 150 updates stored channel availability data for the region using the determination.

Graphical Representations

Figure 8:
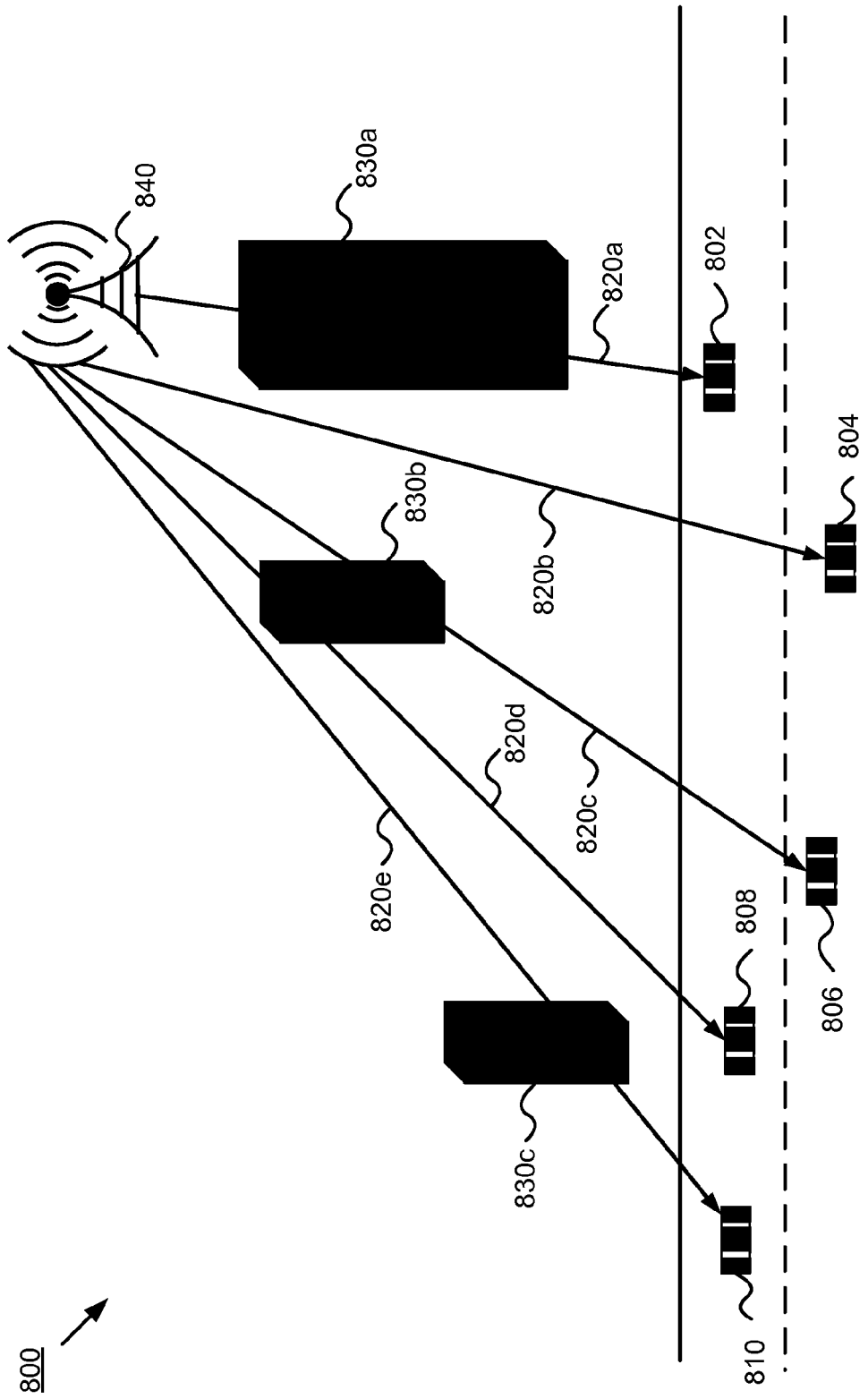
FIG. 8 is a graphical representation illustrating a mobile vehicular environment where shadowing affects performance of sensing according to one embodiment.

FIG. 8 is a graphical representation 800 illustrating a mobile vehicular environment where shadowing affects the performance of sensing according to one embodiment. Element 801 is a graphical representation of a road 801. For example, the road 801 is a highway. Elements 802, 804, 806, 808, 810 are graphical representations of vehicles 802, 804, 806, 808, 810. For example, the vehicles 802, 804, 806, 808, 810 are moving on the road 801.

Elements 820a, 820b, 820c, 820d, 820e are graphical representations of signal paths 820a, 820b, 820c, 820d, 820e from a communication base station 840 to vehicles 802, 804, 806, 808, 810 respectively. The communication base station 840 is a primary transmitter. Elements 830a, 830b, 830c are graphical representations of obstructions such as buildings 830a, 830b, 830c. In the depicted embodiment, the signal path 820a is obscured by the building 830a. The signal path 820c is obscured by the building 830b and the signal path 820e is obscured by the building 830c. This is called shadowing that will affect performance of sensing algorithms.

Figure 9A:
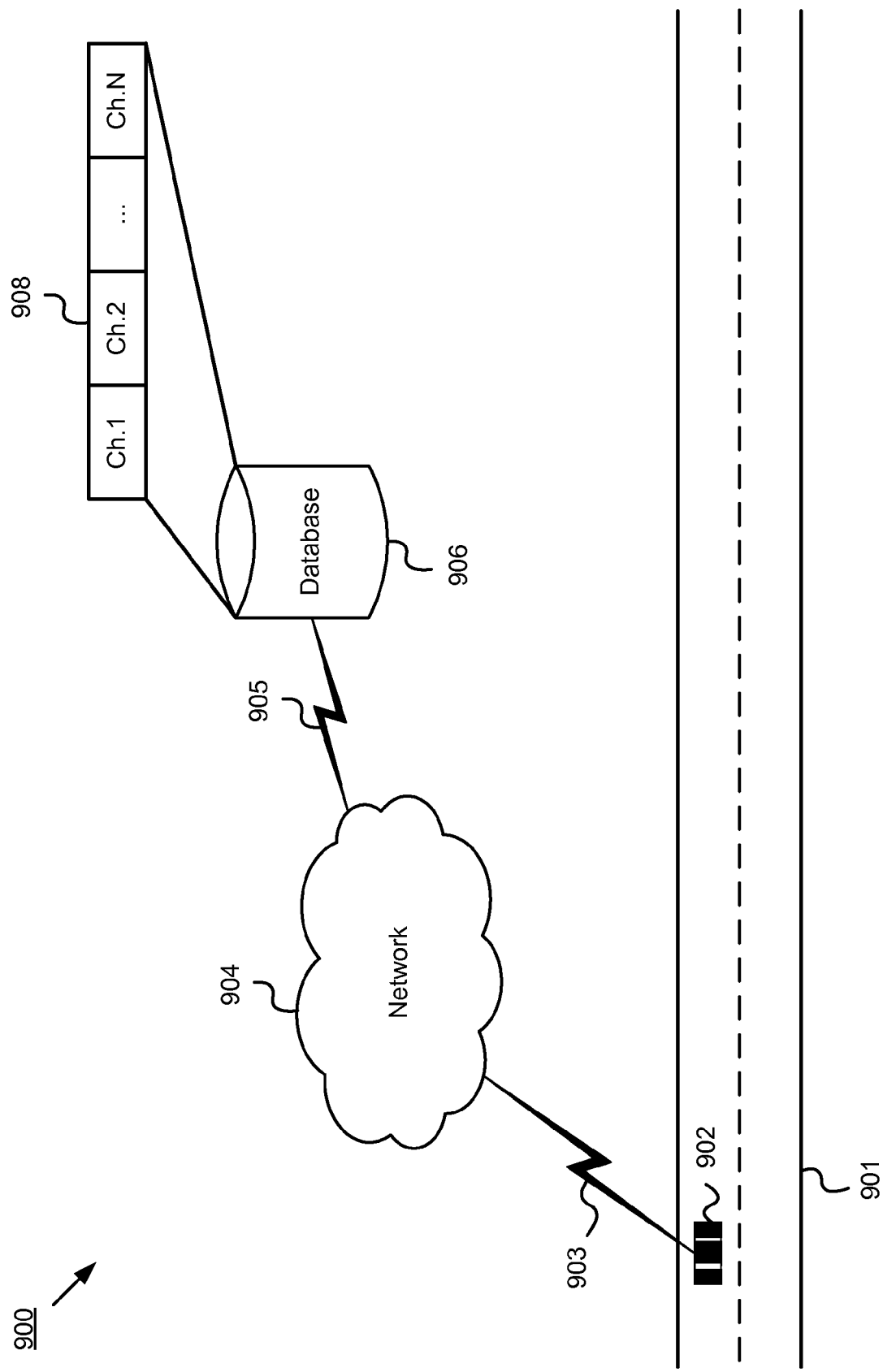

FIGS. 9A-9B are graphical representations illustrating a mobile vehicular environment where spectrum sensing through location diversity is implemented according to one embodiment.

Referring to FIG. 9A, depicted is a graphical representation 900 illustrating a mobile vehicular environment where a vehicle retrieves channel availability data from a database according to one embodiment. Element 901 is a graphical representation of a road 901. For example, the road 901 is a highway. Element 902 is a graphical representation of a vehicle 902.

Element 904 is a graphical representation of a network 904. Element 903 is graphical representation of a wireless communication connection 903 between the vehicle 902 and the network 904. Element 906 is a graphical representation of a database 906. Element 905 is graphical representation of a wireless communication connection 905 between the database 906 and the network 904. Element 908 is a graphical representation of data 908 stored in the database 906. For example, the data 908 is a table indicating potentially available channels.

Referring to FIG. 9B, depicted is a graphical representation 950 illustrating a mobile vehicular environment where a vehicle does spectrum sensing through location diversity according to one embodiment. Element 901 is the same as that seen in FIG. 9A, which is a graphical representation of a road 901. Elements 902 are graphical representations of a vehicle 902 at different locations. Elements 903a, 903b, 903c are representations of locations x1, x2, x3 for the vehicle 902. Elements 910, 912, 914 are graphical representations of signal paths 910, 912, 914 from a communication base station 920 to the vehicle 902 at location 903a, 903b, 903c respectively.

Figure 10:
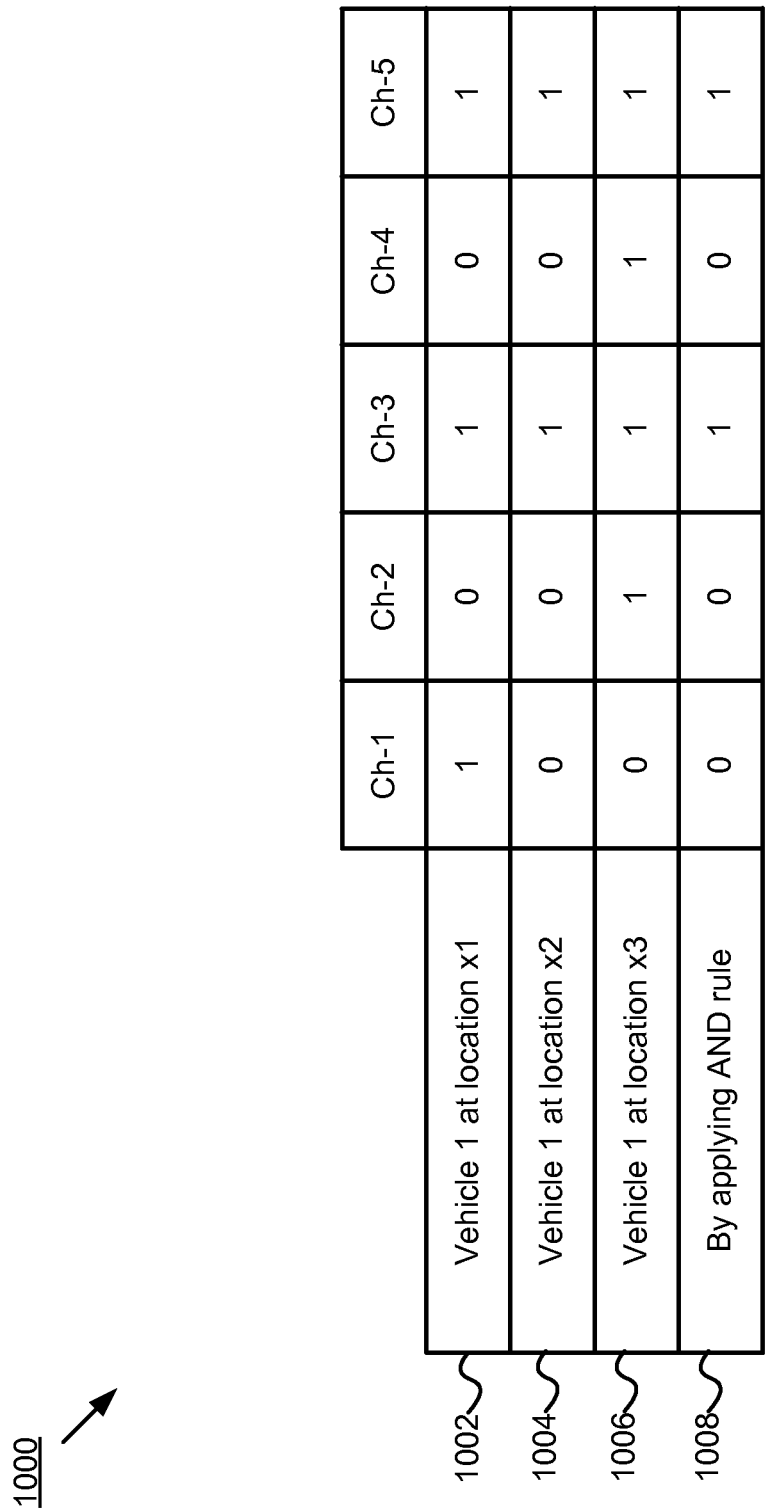
FIG. 10 shows a table illustrating sensing aggregation through hard decision fusion according to one embodiment.

FIG. 10 shows a table 1000 illustrating sensing aggregation through hard decision fusion according to one embodiment. Elements 1002, 1004, 1006 are representations of entries 1002, 1004, 1006 including sensed values for all channels at different locations. For example, the sensed values for all channels are states (such as 0, 1) indicating presence or absence of primary users in all channels. Element 1008 is a representation of an entry 1008 including aggregated sensed values for all channels. For example, the aggregated sensed value such as a state of primary user for one channel is obtained by applying AND rule over the states at different locations for that channel.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for determining availability of a channel, the method comprising:
retrieving channel availability data for a region, the channel availability data describing potential availability of a channel;
obtaining a set of values for the channel by spectrum sensing at a set of locations in the region based at least in part on the potential availability of the channel;
aggregating the set of values for the channel over the set of locations in the region to obtain a first value for the channel; and
determining the availability of the channel based at least in part on the first value for the channel.

2. The method of claim 1, wherein a value in the set of values indicates a state of a primary user for the channel at a location in the set of locations.

3. The method of claim 2, wherein the state of the primary user for the channel comprises one or more of a presence and an absence.

4. The method of claim 1, wherein a value in the set of values indicates a signal power for the channel at a location in the set of locations.

5. The method of claim 1, wherein locations in the set of locations are geographically close to each other.

6. The method of claim 1 further comprising:
weighing values in the set of values for the channel based at least in part on locations in the set of locations that the values correspond to.

7. The method of claim 1 further comprising:
broadcasting data describing the first value for the channel.

8. The method of claim 1 further comprising:
receiving data describing a second value for the channel; and
aggregating the second value for the channel with the first value for the channel to determine the availability of the channel.

9. A system for determining availability of a channel, the system comprising:
a requesting module for retrieving channel availability data for a region, the channel availability data describing potential availability of a channel;
a detecting module communicatively coupled to the requesting module, the detecting module obtaining a set of values for the channel by spectrum sensing at a set of locations in the region based at least in part on the potential availability of the channel; and
an aggregation module communicatively coupled to the detecting module, the aggregation module aggregating the set of values for the channel over the set of locations in the region to obtain a first value for the channel, the aggregation module also determining the availability of the channel based at least in part on the first value for the channel.

10. The system of claim 9, wherein a value in the set of values indicates a state of a primary user for the channel at a location in the set of locations.

11. The system of claim 10, wherein the state of the primary user for the channel comprises one or more of a presence and an absence.

12. The system of claim 9, wherein a value in the set of values indicates a signal power for the channel at a location in the set of locations.

13. The system of claim 9, wherein locations in the set of locations are geographically close to each other.

14. The system of claim 9, wherein the aggregation module further weighs values in the set of values for the channel based at least in part on locations in the set of locations that the values correspond to.

15. The system of claim 9 further comprising a collaboration module communicatively coupled to the aggregation module, the collaboration module broadcasting data describing the first value for the channel.

16. The system of claim 9 further comprising a collaboration module communicatively coupled to the aggregation module, the collaboration module receiving data describing a second value for the channel and aggregating the second value for the channel with the first value for the channel to determine the availability of the channel.

17. A computer program product comprising a non-transitory computer readable medium encoding instructions that, in response to execution by a computing device, cause the computing device to perform operations comprising:
- retrieving channel availability data for a region, the channel availability data describing potential availability of a channel;
- obtaining a set of values for the channel by spectrum sensing at a set of locations in the region based at least in part on the potential availability of the channel;
- aggregating the set of values for the channel over the set of locations in the region to obtain a first value for the channel; and
- determining the availability of the channel based at least in part on the first value for the channel.

18. The computer program product of claim 17, wherein a value in the set of values indicates a state of a primary user for the channel at a location in the set of locations.

19. The computer program product of claim 18, wherein the state of the primary user for the channel comprises one or more of a presence and an absence.

20. The computer program product of claim 17, wherein a value in the set of values indicates a signal power for the channel at a location in the set of locations.

21. The computer program product of claim 17, wherein locations in the set of locations are geographically close to each other.

22. The computer program product of claim 17, wherein instructions encoded in the non-transitory computer readable medium when executed cause the computing device to perform operations further comprising:
- weighing values in the set of values for the channel based at least in part on locations in the set of locations that the values correspond to.

23. The computer program product of claim 17, wherein instructions encoded in the non-transitory computer readable medium when executed cause the computing device to perform operations further comprising:
- broadcasting data describing the first value for the channel.

24. The computer program product of claim 17, wherein instructions encoded in the non-transitory computer readable medium when executed cause the computing device to perform operations further comprising:
- receiving data describing a second value for the channel; and
- aggregating the second value for the channel with the first value for the channel to determine the availability of the channel.

\* \* \* \* \*